Patented July 2, 1946

2,403,109

UNITED STATES PATENT OFFICE 2,403,109

METHOD OF BRAZING

Mike A. Miller, New Kensington, Pa., assignor to Aluminum Company of America, Pittsburgh, Pa., a corporation of Pennsylvania No Drawing. Application March 25, 1943, Serial No. 480,561

2 Claims. (Cl. 148—24)

This invention relates to methods of handling brazing flux during the brazing of aluminum and alloys thereof.

The invention has general reference to those methods of brazing in which the heat necessary to the brazing operation is furnished by a bath of heated flux. The invention has specific reference to such methods when the bath of heated flux is, as is usual in the brazing of aluminum and its alloys, composed of the chlorides and fluorides of the alkali metals and alkaline earth metals. Such fluxes may also contain small amounts of other compounds, but a preponderant content of the chlorides and fluorides of the alkali metals and the alkaline earth metals is characteristic. These fluxes, when held in molten condition at the relatively high brazing temperatures, are very active chemically toward most of the metals from which holding pots or receptacles can be formed and consequently the pot is either destroyed in a short time or the flux becomes so contaminated with reaction product resulting from the attack of the flux on the holding pot that the functional qualities of the flux are impaired.

In the brazing operations to which this invention is particularly directed the aluminum or aluminum base alloy parts which are to be joined are assembled in a jig or by similar device held in the relationship and position sought to be established by the brazing operation. If the thus assembled parts have not been provided with a coating of brazing metal or alloy, suitably shaped pieces of brazing alloy are likewise assembled in proper relationship to the area of proposed juncture of the aluminum parts. The assembly is then immersed in the bath of molten flux which serves the dual function of exerting a fluxing action to promote the brazing and of supplying sufficient heat to melt the fusible brazing metal or alloy and thus effect the joint. Since the temperatures to which the flux bath must be brought to effect these purposes are usually in the range of 800 to 1200° F., the chemically active flux severely attacks, as before stated, the receptacles and pots in which the flux is necessarily heated and held. The flux also attacks the metal fixtures or jigs such, as aforesaid, are used to maintain the assembly of parts to be joined or are otherwise used to present the work to the operation in the flux. Thus, while it is possible to employ ceramic receptacles or receptacles made of other non-reactive, non-metallic material to hold the molten flux, the problem of flux attack is not eliminated thereby since the use of metal fixtures or jigs is usually necessary or desirable during the fluxing and brazing operation.

The common metal least attacked by these molten fluxes is nickel. Alloys containing high percentages of nickel are likewise relatively resistant to the attack. However, when receptacles, fixtures, jigs and other flux contacting elements are made of nickel or high percentage nickel alloys the problem of attack is only relatively diminished since the attack of the flux finally impairs or destroys nickel or nickel alloy parts.

It has been established or, at least, believed that this attack by the flux on the nickel or nickel alloy is caused or promoted by impurities present in the flux constituents in minute amounts. The greatest harmful effect has been ascribed to minute amounts of sulfur impurities and it has been proposed, to avoid the expense of using impurity-free flux components, that the flux be preliminarily treated by contacting it, in molten condition, with pieces of nickel in order to achieve a preliminary reaction between the nickel and the impurities and thus exhaust the capacity of the impurities to attack the nickel pot into which the flux is to be finally placed or the nickel fixtures or jigs used during the brazing operation. To thus preliminarily treat large quantities of flux is an expensive and cumbersome operation.

The present invention is predicated upon my discovery that the presence in the flux during the brazing operation of comminuted nickel does not interfere in any way with the brazing operation and simultaneously protects the nickel pot or receptacle in which the molten flux is held, or the nickel fixtures or jigs present during the operation, against the action of the molten flux. My invention therefore contemplates the use of a flux in which is present, in addition to the flux constituent, a quantity of small nickel pieces or particles such as nickel powder, filings, turnings, borings or the like. Of such forms of nickel I prefer to use the very finely divided forms which are often used as catalysts such as, for example, the form prepared by treating aluminum-nickel alloy with caustic solution. The nickel particles may be added to the flux as it is melted in the nickel receptacle, but better results are obtained if a powdered flux containing small particles of nickel intimately mixed therewith is initially prepared, as by mixing the flux powder with the nickel powder, and thereafter melted in the nickel or nickel alloy pot or in contact with fixtures, jigs or other parts made of this metal and its alloys. The proportion of nickel particles to the flux which is necessary to obtain optimum results may vary. When using very finely divided nickel particles of relatively high surface area, I have obtained good results with amounts as small as 0.5 to 1 per cent by weight of the total mixture, and with larger nickel particles I have obtained excellent results with 2.5 per cent by weight. Expense is a factor to be taken into consideration in preparing the mixture and usually amounts of nickel in excess of 10 per cent by weight of the total flux are wasteful and unnecessary regardless of the size and area of the nickel particles.

The presence of the nickel in the flux does not appear to be harmful to the brazing operation, and the same brazing effect is secured whether or not the nickel is present in the flux. However, the attack by the molten flux upon the nickel parts with which it is in contact is greatly diminished by the use of my invention and the life of the parts is greatly lengthened. While my improved flux and method of fluxing is particularly advantageous when used in an operation where nickel parts are in contact with the flux, the method and the flux may likewise be used where parts made of other metals or alloys are in contact with the flux.

As an example of this effect may be cited a typical instance where nickel test pieces were attacked almost four times as much, as measured microscopically, by a molten flux largely composed of alkali metal chloride and fluoride, as by the same flux to which had been added 1 per cent by weight of finely divided nickel.

In place of, or in combination with, pure nickel particles there may be used, in the practice of the invention, particles composed in part of nickel such as, for instance, particles composed of nickel alloyed with other metals. Thus, for example, Monel metal, aluminum-nickel alloys and other nickel containing alloys may form the particles. The term "nickel particles" used herein and in the appended claims is intended to define and include all such particles as well as particles composed solely of nickel.

Having thus described my invention, what I claim is:

1. In that method of brazing comprising the immersion of the articles to be joined into a bath of molten brazing flux composed largely of the fluorides and chlorides of the alkali metal and alkaline earth metals and in contact with a receptacle or other part composed of nickel or high percentage nickel alloy, the improvement consisting in providing the molten flux with a content of nickel particles in amount of about 0.5 to 10 per cent by weight of the total nickel particle-flux mixture, and immersing said articles in said nickel particle-flux mixture.

2. In that method of brazing articles made of aluminum or aluminum base alloy comprising the immersion of the articles to be joined into a bath of molten brazing flux composed largely of the fluorides and chlorides of the alkali metal and alkaline earth metals and in contact with a receptacle or other part composed of nickel or high percentage nickel alloy, the improvement consisting in providing the molten flux with a content of nickel particles in amount of about 0.5 to 10 per cent by weight of the total nickel particle-flux mixture, and immersing said articles in said nickel particle-flux mixture.

MIKE A. MILLER.